June 7, 1949. R. B. SCHULZE 2,472,623
AIR TRANSPORTATION OF SMALL PARCELS
Filed Nov. 10, 1945 2 Sheets-Sheet 1
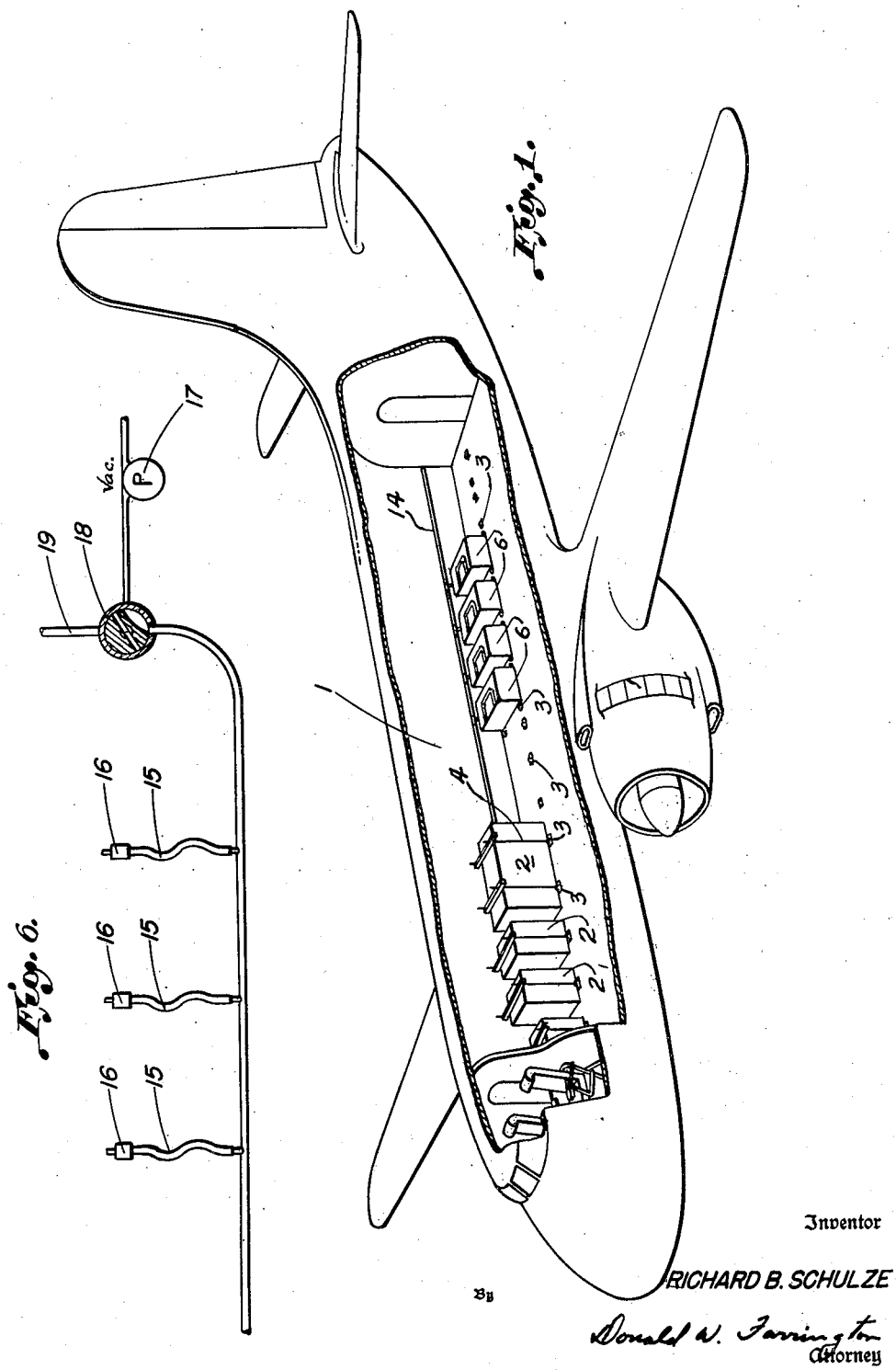
Inventor
RICHARD B. SCHULZE
By Donald W. Farrington
Attorney

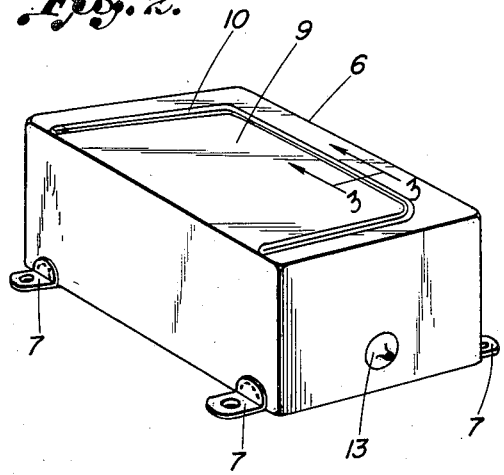
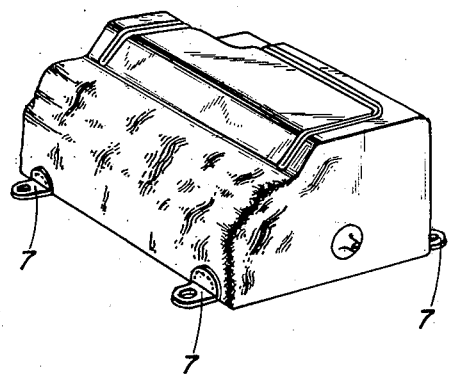
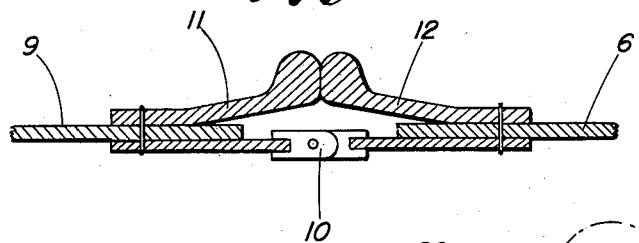
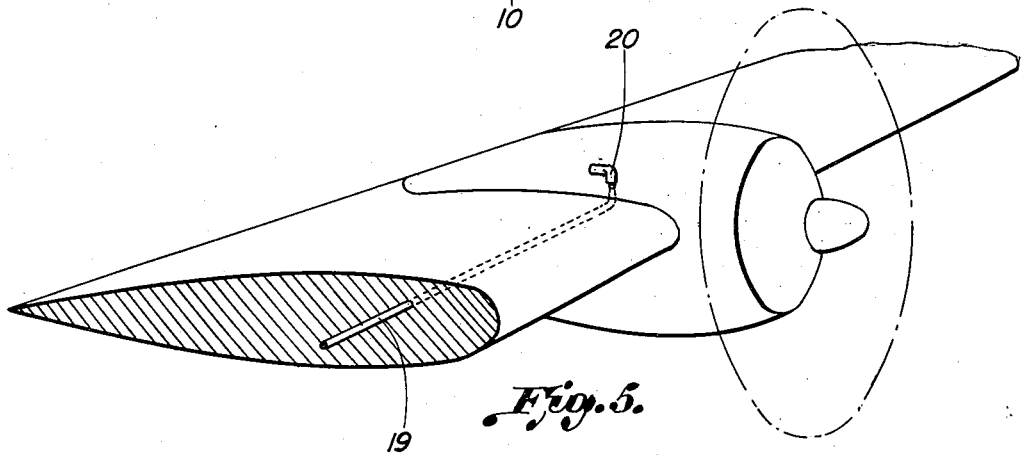

Patented June 7, 1949

2,472,623

UNITED STATES PATENT OFFICE 2,472,623

AIR TRANSPORTATION OF SMALL PARCELS

Richard B. Schulze, Baltimore, Md., assignor to The Glenn L. Martin Company, Middle River, Md., a corporation of Maryland Application November 10, 1945, Serial No. 627,910

6 Claims. (Cl. 244—118)

This invention relates to a system and apparatus for the transportation of cargo in aircraft and more particularly to the transportation of small parcels of cargo by air express.

It is now common practice to transport large boxes or crates in airplanes and employ special equipment such as tie rods and braces secured to fittings in the floor to hold such boxes or crates in place in the aircraft. Tying down large boxes or crates by means of special tie down equipment or simply by means of nets or ropes does not present much of a problem because of the size and bulk of these large cargo containers. When it is desired to transport small parcels by air express, it is usual to place such parcels loosely in a space in the airplane and when they arrive at their destination they must be separately handled and sorted. If there is a stop enroute, an air express attendant must enter the compartment and sort out those parcels that will be there unloaded, leaving the remainder for other and further destinations. Due to the inherent motion of the aircraft in flight, small parcels and hand luggage experience considerable damage when placed in loosely in a compartment in an airplane for transportation.

By this invention a cargo carrying container for air express is provided, particularly designed to transport small parcels and to protect them while in flight.

An object of this invention is to provide a plurality of individual parcel carriers which can be removably secured to fittings in the floor and arranged to retain and secure small parcels in place while in flight.

Another object of this invention is to provide a plurality of parcel containers in which parcels may be placed that are of common destination so that the complete container can be unloaded quickly at any stop.

Another object of this invention is the provision of a parcel container which is of air-tight, light-walled flexible material which, upon being evacuated, will collapse around the parcels therein to secure the same in place by atmospheric pressure.

Another object of this invention is the provision of a manifold exhaust header having fittings which can be quickly connected and disconnected from the parcel containers.

Another object of this invention is the provision of a manifold exhaust header including a valve which selectively connects the exhaust header to the vacuum pump of the airplane or to an aspirator head on the airplane for use while in flight.

Further and other objects will become apparent from the description of the accompanying drawings which form a part of this disclosure and in which like numerals refer to like parts.

In the drawings:

Figure 1 is a view of an airplane partly in section to show the parcel transportation system.

Figure 2 is a view of the container.

Figure 3 is a sectional view taken on the line 3—3 of Figure 2.

Figure 4 is a view of the container shown in Figure 2 collapsed under atmospheric pressure.

Figure 5 shows the location of the aspirator on the engine nacelle.

Figure 6 is a fragmentary view of the manifold header.

The airplane illustrated in Figure 1 shows in the forward part of the cargo compartment 1, boxes or crates 2, which are tied down to fittings 3 in the floor in the conventional manner by means of tie rods and cross bars 5. This works quite satisfactorily for large regularly shaped articles but for small parcels of air express, containers 6 will be employed which have fittings 7 that may be secured to complementary fittings 3 in the floor of the aircraft. Containers 6 are preferably of rectangular form and of dimensions that can be suitably accommodated in the aircraft. The container is made from rubberized or impregnated fabric such as canvas or duck that will be sufficiently wear-resistant to stand repeated use, but that will be sufficiently flexible so that when air is exhausted therefrom, the walls of the containers will collapse and snugly fit around the contour of the parcels enclosed thereby, and atmospheric pressure will assist in holding these parcels in place.

Access to the container for loading is afforded through flap 9 which is secured around its edge by slide fastener 10. The slide fastener 10 may be of any conventional form and secured to the adjacent edges of the opening in container 6 and flap 9. Members 11 and 12 are formed of a resilient material having flexible, rubber-like characteristics and can be parted to permit manipulation of the slide fastener but in their normal position abutting one another to afford a pressure seal.

Container 6 is provided with a fitting 13 which permits exhausting the air from within. When containers 6 are secured in place on the airplane floor, manifold header 14, which extends along the side wall of the cargo compartment, is connected to fitting 13 by means of flexible conduits 15 and fitting 16. This manifold header 14 is connected to the vacuum system 17 of the airplane by valve 18 or it may be put in communication with conduit 19 which is connected to an aspirator head 20 located on the exterior of the aircraft in the slip stream preferably on the wing or nacelle.

In operation, small parcels of air express may be loaded into containers 6 prior to being placed in the airplane or they may be loaded while the containers are in place in the airplane. The preloaded containers will contain parcels intended for the same destinations. They will be put in place in the airplane and fittings 7 will be secured to the floor by fittings 3. Each container will then be connected to the exhaust manifold by fittings 13 and 16. While the airplane is on the ground, valve 18 will place manifold 14 in communication with vacuum pump 17. After the airplane is in flight, manifold 14 will be placed in communication with conduit 19 and aspirator head 20 to afford a means for evacuating the containers at all times. It is not necessary to have an absolute seal between members 11 and 12 on the slide fasteners 10 because the capacity of either the vacuum pump or the aspirator is more than sufficient to maintain a few pounds per square inch differential in pressure to hold the parcels in place in container 6 by atmospheric pressure. It is more than likely that the slide fastener will permit the passage of enough air to prevent evacuating container 6 to an objectionable extent. Fittings 16 are valved so that they will close when not connected to fittings 13. Manifolds 14 may be arranged on each side of the wall of the cargo compartment of an airplane with conduits 15 of sufficient length so that containers 6 may be stacked in racks or tiers and connected to single header or multiple headers. By having containers 6 fastened to the tie downs in the floor that are used with tie rods 4, as many containers 6 may be used as will accommodate the amount of small parcels of air express while the balance of the cargo compartments may be used for larger units of air express tied down in the conventional manner.

It is to be understood that certain changes, alterations, modifications and substitutions may be made without departing from the spirit and scope of the appended claims.

I claim as my invention:

1. An air express transportation system including an airplane having a cargo carrying compartment, a plurality of air impervious, flexible walled collapsible parcel containers located in said compartment, detachable connections for securing said containers in place relative to the aircraft structure, a manifold suction header extending along the wall of said compartment, and flexible connections interconnecting said containers and said header to effect a reduced pressure in said containers.

2. An air express transportation system including an airplane having a cargo carrying compartment, a plurality of air impervious, flexible walled, collapsible parcel containers located in said compartment, detachable connections for securing said containers in place relative to the aircraft structure, a manifold suction header arranged along the wall of said compartment, and flexible connections interconnecting said containers and said header to effect a reduced pressure in said containers, said manifold suction header terminating in a selector valve to connect header to a vacuum pump when the plane is on the ground or to an aspirator head when the plane is in flight.

3. An air express transportation system including an airplane having a cargo carrying compartment, a plurality of air impervious, flexible walled, collapsible parcel containers located in said compartment, detachable connections for securing said containers in place relative to the aircraft structure, a manifold suction header arranged along the wall of said compartment, and flexible connections interconnecting said containers and said header to effect a reduced pressure in said containers, said parcel containers having pressure sealed access openings.

4. An air express transportation system including an airplane having a cargo carrying compartment, a plurality of air impervious, flexible walled, collapsible parcel containers located in said compartment, means to detachably secure said containers in place in said compartment, and suction means to reduce the pressure in said containers so that atmospheric pressure will collapse said containers around the parcels therein to secure the same in place during flight.

5. An air express transportation system including an airplane having a cargo carrying compartment, a plurality of air impervious, flexible walled, collapsible parcel containers located in said compartment, detachable connections for securing said containers in place relative to the aircraft structure, a manifold suction header arranged along said compartment, flexible connections interconnecting said containers and said header to effect a reduced pressure in said containers, said flexible connections including a quickly detachable fitting for connection to said container and valve means in said fitting to close said flexible connection when detached from said container.

6. An air express transportation apparatus including an air impervious, flexible walled, collapsible parcel container, tie down means secured to said container adjacent the bottom thereof for detachably securing the container to a supporting surface, a wall portion of said container being provided with an access opening and a closure therefor including a slide fastener to secure the closure to the peripheral edges of the wall around said opening, cooperating pressure sealing means on the peripheral edges of said wall and said closure to minimize the leakage of air into said container, and a fitting formed in the wall of said container through which the air in the container may be exhausted, when said closure is closed, to collapse said container.

RICHARD B. SCHULZE.

REFERENCES CITED

The following references are of record in the file of this patent:

UNITED STATES PATENTS

| Number | Name | Date |
|---|---|---|
| 1,792,480 | Black | Feb. 17, 1931 |
| 2,107,216 | Rogers | Feb. 1, 1938 |
| 2,115,424 | Lesti | Apr. 26, 1938 |
| 2,326,263 | Steiner | Aug. 10, 1943 |
| 2,334,124 | Peterson | Nov. 9, 1943 |
| 2,370,799 | Kelley | Mar. 6, 1945 |
| 2,378,159 | Royer | June 12, 1945 |